United States Patent
Wieber et al.

(10) Patent No.: US 8,889,092 B2
(45) Date of Patent: Nov. 18, 2014

(54) METHOD FOR PRODUCING HIGHER HYDRIDOSILANE COMPOUNDS

(75) Inventors: Stephan Wieber, Karlsruhe (DE); Matthias Patz, Bottrop (DE); Jutta Hessing, Dorsten (DE); Janette Klatt, Recklinghausen (DE)

(73) Assignee: Evonik Degussa GmbH, Essen (DE)

(*) Notice: Subject to any disclaimer, the term of this patent is extended or adjusted under 35 U.S.C. 154(b) by 0 days.

(21) Appl. No.: 13/824,641

(22) PCT Filed: Sep. 27, 2011

(86) PCT No.: PCT/EP2011/066742
§ 371 (c)(1),
(2), (4) Date: Mar. 18, 2013

(87) PCT Pub. No.: WO2012/041837
PCT Pub. Date: Apr. 5, 2012

(65) Prior Publication Data
US 2013/0183223 A1    Jul. 18, 2013

(30) Foreign Application Priority Data
Oct. 1, 2010  (DE) .................. 10 2010 041 842

(51) Int. Cl.
C08G 77/12    (2006.01)
C08G 77/60    (2006.01)
C23C 18/12    (2006.01)
C01B 33/04    (2006.01)

(52) U.S. Cl.
CPC ............ *C01B 33/04* (2013.01); *C08G 77/60* (2013.01); *C08G 77/12* (2013.01); *C23C 18/122* (2013.01)
USPC .......................................... 423/347; 423/344

(58) Field of Classification Search
USPC ................................................ 423/347, 344
See application file for complete search history.

(56) References Cited

U.S. PATENT DOCUMENTS

| 5,700,400 A | 12/1997 | Ikai et al. |
| 2003/0229190 A1 | 12/2003 | Aoki et al. |
| 2006/0222583 A1 | 10/2006 | Hazeltine |
| 2007/0190265 A1 | 8/2007 | Aoki et al. |
| 2011/0189072 A1 | 8/2011 | Brausch et al. |
| 2011/0268642 A1 | 11/2011 | Brausch et al. |
| 2011/0318939 A1 | 12/2011 | Shimoda et al. |
| 2012/0205654 A1 | 8/2012 | Stuetzel et al. |
| 2012/0214005 A1 | 8/2012 | Wieber et al. |
| 2012/0263639 A1 | 10/2012 | Brausch et al. |
| 2012/0273805 A1 | 11/2012 | Wieber et al. |
| 2012/0291665 A1 | 11/2012 | Wieber et al. |
| 2013/0168824 A1 | 7/2013 | Wieber et al. |

FOREIGN PATENT DOCUMENTS

| EP | 1 357 154 | 10/2003 |
| WO | 2010 079842 | 7/2010 |
| WO | 2011 061106 | 5/2011 |
| WO | 2012 028476 | 3/2012 |
| WO | 2012 038118 | 3/2012 |
| WO | 2012 041837 | 4/2012 |
| WO | 2012 055693 | 5/2012 |
| WO | 2012 072401 | 6/2012 |
| WO | 2012 072403 | 6/2012 |
| WO | 2012 072406 | 6/2012 |
| WO | 2012 080003 | 6/2012 |
| WO | 2012 084897 | 6/2012 |
| WO | 2012 130620 | 10/2012 |

OTHER PUBLICATIONS

U.S. Appl. No. 13/989,823, filed May 28, 2013, Wieber, et al.
U.S. Appl. No. 13/991,261, filed Jun. 3, 2013, Stenner, et al.
U.S. Appl. No. 13/885,316, filed May 14, 2013, Stenner, et al.
U.S. Appl. No. 13/991,986, filed Jun. 6, 2013, Brausch, et al.
International Search Report Issued May 4, 2012 in PCT/EP11/066742 Filed Sep. 27, 2011.

*Primary Examiner* — Edward Johnson
(74) *Attorney, Agent, or Firm* — Oblon, Spivak, McClelland, Maier & Neustadt, L.L.P.

(57) ABSTRACT

The present invention relates to a rapid and metal-free process for preparing high order hydridosilane compounds from low order hydridosilane compounds, wherein at least one low order hydridosilane compound (I) is thermally reacted in the presence of at least one hydridosilane compound (II) having a weight average molecular weight of at least 500 g/mol, to the hydridosilane compounds obtainable by the process and to their use.

20 Claims, No Drawings

METHOD FOR PRODUCING HIGHER HYDRIDOSILANE COMPOUNDS

CROSS REFERENCE TO RELATED APPLICATIONS

The present application is a 35 U.S.C. §371 national stage patent application of International patent application PCT/EP2011/066742, filed on Sep. 27, 2011, published as WO 2012/041837 on Apr. 5, 2012, the text of which is incorporated by reference, and claims the benefit of the filing date of German application no. 102010041842.0, filed on Oct. 1, 2010, the text of which is also incorporated by reference.

The present invention relates to a process for fast and metal-free preparation of high order hydridosilane compounds from low order hydridosilane compounds, to the high order hydridosilane compounds obtainable with the process and to their use. If these materials are to be used for semiconductor applications and optoelectronic components it is vitally important that they shall be free of any metal.

Hydridosilane compounds, including hydridosilanes, are described in the literature as possible starting materials for the production of silicon layers.

Hydridosilanes are compounds that contain silicon and hydrogen atoms only. Hydridosilanes can in principle be gaseous, liquid or solid and they are—especially in the case of solids—essentially soluble in solvents such as toluene or cyclohexane or in liquid silanes such as cyclopentasilane. Disilane, trisilane, tetrasilane, pentasilane and neopentasilane are mentioned by way of example. Hydridosilanes having at least three or four silicon atoms can have a linear, branched or (optionally bi/poly)cyclic structure with Si—H bonds and are conveniently describable by the respective generic formulae $Si_nH_{2n+2}$ (linear or branched; with n>=2), $Si_nH_{2n}$ (cyclic; with n=3-20) or $Si_nH_{2(n-i)}$ (bi- or polycyclic; n=4-20; i={number of cycles}−1).

Hydridosilane compounds that are not hydridosilanes are, by contrast, substituted hydridosilanes, in which case preferred substituted hydridosilane compounds are hydridosilanes comprising substituents based on element compounds of periodic table group III, IV and V, especially hydridosilanes with substituents —$BY_2$ (where each Y is independently of the other —H, -alkyl or -phenyl), —$C_nR_{2n+1}$ (with each R independently of the others —H, -alkyl or -phenyl) and —$PR_2$ (with each R independently of the other —H, -alkyl, -phenyl or —$SiR'_3$ with R'=-alkyl).

Even though, in principle, many hydridosilane compounds can be used for silicon layer production, especially hydridosilanes, it has transpired that only high order hydridosilane compounds (especially hydridosilanes), i.e. hydridosilane compounds having more than 10 silicon atoms, are capable of coating customary substrates such that the coated layers obtained thereon are effective in hiding the substrate surface, are homogeneous and have few defects. Therefore, there is interest in processes for preparing high order hydridosilane compounds (especially high order hydridosilanes). Many high order hydridosilane compounds, especially hydridosilanes, are obtainable by oligomerizing low order hydridosilane compounds, especially low order hydridosilanes. Oligomerizing low order hydridosilanes or hydridosilane compounds amounts formally to using two identical or different low order (optionally substituted) hydridosilane (compound) molecules to construct a high order hydridosilane (compound) molecule by abstraction of hydrogen and/or minor hydridosilyl moieties.

DE 2 139 155 A1 for instance describes a process for preparing hydridosilanes by pyrolysis of trisilane, n-tetrasilane and/or n-pentasilane. However, this process is technically very inconvenient, since the reaction initially involves the starting silane being vaporized under high vacuum, the pyrolysis being subsequently carried out over a glass wool catalyst and the decomposition products thereafter having to be condensed and separated by gas chromatography.

EP 630 933 A2 describes a process for forming a condensate thermally convertible into a semiconducting material. The condensate is obtained by dehydropolymerization reaction of a hydridosilane monomer based on monomers selected from monosilane, disilane and trisilane in the presence of a catalyst comprising one or more than one metal and/or metal compound. However, this process is disadvantageous in that the catalyst used has to be removed, at some cost and inconvenience, after the reaction has ended.

JP 6 128 381 A, U.S. Pat. No. 5,700,400 A and U.S. Pat. No. 5,252,766 A describe catalyzed hydridosilane syntheses, namely a process comprising the reaction of a hydrosilane compound in the presence of a transition metal or transition metal complex. Again a disadvantage is that the catalyst used has to be removed, at some cost and inconvenience, after the reaction has ended. Moreover, appropriate catalyst systems are costly and inconvenient to prepare.

U.S. Pat. No. 6,027,705 A describes a multi-stage process for preparing trisilanes or higher silanes from mono- or disilane. A condensate, conversion of mono- or disilane in a first reaction stage can be converted thermally in a second reaction from a zone (preferably at temperatures of 250-450° C.) to form a mixture of silanes with higher molecular weight. The problem with this is, however, that only a small proportion of high molecular weight silanes is obtainable at these temperatures; it is essentially silanes with 3 to 7 silicon atoms which predominate the product mixture as well as the mono- or disilane reactants. Therefore, the process is not suitable for synthesizing high order hydridosilane compounds, i.e. hydridosilane compounds having 10 or more silicon atoms.

EP 1 357 154 A1 describes high order silane compositions containing a polysilane obtainable by irradiating a photopolymerizable silane with UV radiation. The polysilanes can have a molecular weight, as measured by MALDI-TOF-MS, of up to 1800 g/mol, in which case the peak of the molecular weight distribution is between 200 and 700 g/mol. The photopolymerizable silane from which the polysilanes are obtainable can be a silane of the general formula $Si_nX_m$ (where n≥3, m≥4, X=H, halogen). However, the compounds which can be used with preference are cyclic silanes of the formula $Si_nX_{2n}$, bi- or polycyclic structures of the formula $Si_nH_{2n-2}$ and other silanes having a cyclic structure in the molecule. However, the disadvantage with this process is that high intensities of radiation are required for successful irradiation. It is a further disadvantage that the homogeneous energy input required to form a homogeneous product (mixture) is difficult to control.

EP 1 640 342 A1 describes silane polymers having an average molecular weight in the range from 800 to 5000 g/mol. These polymers are prepared by irradiating photopolymerizable silanes with light of a specific wavelength range. Useful photopolymerizable silanes include compounds from the group of silanes of the general formula $Si_iX_{2i+2}$ where i=2-10, $Si_jH_{2j}$ where j=3-10, $Si_mX_{2m-2}$ where m=4-10 and $Si_kH_k$ where k=6, 8 or 10. However, the silane polymers obtainable by this process are subject to the same disadvantages as the high order silanes obtainable by EP 1 357 154 A1.

The present invention thus has for its object to avoid the disadvantages of the prior art. The present invention more particularly has for its object to provide a process for preparing high order hydridosilane compounds which is technically less involved and more particularly is not based on a pyrolysis process and does not require costly and inconvenient metal catalyst synthesis and removal, and also avoids the disadvantages of high intensities of radiation and inhomogeneous inputs of energy in the case of photopolymerization reactions. The present invention additionally has for its object to provide a metal-free, efficiently controllable process for preparing high order hydridosilane compounds that proceeds under mild conditions.

This object is achieved herein by the process of the present invention for preparing high order hydridosilane compounds from low order hydridosilane compounds, wherein at least one low order hydridosilane compound (I) is thermally reacted in the presence of at least one hydridosilane compound (II) having a weight average molecular weight of at least 500 g/mol.

The surprising finding was that adding the hydridosilane compound (II) appreciably speeds the reaction leading to high order hydridosilane compounds. Accordingly, the initial portion of hydridosilane compound (II) can be regarded as a template and self-catalyst. Another advantage of this process is that no decomposition, clouding or discoloration of the high order hydridosilane compounds takes place as a result of long reaction times. Furthermore, a process giving a good space-time yield is provided as a result.

The term "hydridosilane compounds" comprehends not only hydridosilanes, i.e. compounds containing silicon and hydrogen atoms only, but also substituted hydridosilane compounds in which case preferred substituted hydridosilane compounds are hydridosilanes comprising substituents based on element compounds of periodic table group III, IV and V, especially hydridosilanes with substituents —$BY_2$ (where each Y is independently of the other —H, -alkyl or -phenyl), —$C_nR_{2n+1}$ (with each R independently of the others —H, -alkyl or -phenyl) and —$PR_2$ (with each R independently of the other —H, -alkyl, -phenyl or —$SiR'_3$ with R'=-alkyl).

A process for preparing high order hydridosilane compounds from low order hydridosilane compounds further comprehends a process wherein high order hydridosilane compounds, especially hydridosilanes, are obtained by oligomerizing low order hydridosilane compounds, especially low order hydridosilanes. Oligomerizing low order hydridosilanes or hydridosilane compounds amounts formally to using two identical or different low order (optionally substituted) hydridosilane (compound) molecules to construct a high order hydridosilane (compound) molecule by abstraction of hydrogen and/or minor hydridosilyl moieties.

The process of the present invention for preparing high order hydridosilane compounds has the great advantage that the use of a metal catalyst is not mandatory. In fact, the process of the present invention is preferably carried out without a metal catalyst, since this obviates the need for costly and inconvenient removal of catalyst. Accordingly, a corresponding process for preparing high order hydridosilane compounds without a metal catalyst likewise forms part of the subject matter of the present invention.

The high order hydridosilane compounds obtainable by the process of the present invention each have on average at least 26 silicon atoms (corresponding to a weight average molecular weight of at least 800 g/mol). In principle, there is no upper limit to the weight average molecular weights of high order hydridosilane compounds obtainable with the process of the present invention. However, said process is particularly suitable for preparing high order hydridosilane compounds having a weight average molecular weight of 1000-10 000 g/mol and even more suitable for preparing high order hydridosilane compounds having a weight average molecular weight of 1000-3000 g/mol. The weight average molecular weights in question can be determined using Standard GPC techniques against polystyrene.

The low order hydridosilane compound (I) to be used according to the present invention is further a hydridosilane compound that is not a high order hydridosilane compound; that is, it is a hydridosilane compound having on average not more than 10 silicon atoms. The reaction with hydridosilane compounds (I) having on average from 3 to 10 silicon atoms is preferred, since this leads to particularly good results. The process of the present invention further performs particularly well with low order hydridosilane compounds that are low order hydridosilanes.

It is very particularly preferable to conduct the process of the present invention with low order hydridosilanes (I) selected from the group of linear or branched hydridosilanes of the generic formula $Si_nH_{2n+2}$ with n=3-10. These are simple to synthesize and are further suitable for preparing high order hydridosilanes possessing particularly good suitability for coatings in semiconductor applications. It is even more preferable for the low order hydridosilane compound (I) to be a hydridosilane selected from the group consisting of $SiH(SiH_3)_3$, $Si(SiH_3)_4$, $Si(SiH_3)_3(SiH_2SiH_3)$, $Si(SiH_3)_2(SiH_2SiH_3)_2$, $Si(SiH_3)(SiH_2SiH_3)_3$ and $Si(SiH_2SiH_3)_4$, since this leads to even better results. Very particularly good results are obtained when the at least one hydridosilane compound (I) is neopentasilane ($Si(SiH_3)_4$) owing to the high symmetry of the molecule and uniform oligomers resulting therefrom.

In principle, the at least one low order hydridosilane compound (I) can be one hydridosilane compound or a mixture of two or more hydridosilane compounds. However, the reaction is particularly controllable and steerable using just one low order hydridosilane compound (I) and more preferably just one low order hydridosilane.

Furthermore, the at least one low order hydridosilane compound (I) is reacted in the presence of at least one hydridosilane compound (II) having a weight average molecular weight of at least 500 g/mol. An appropriate hydridosilane compound (II) will be a high order hydridosilane compound. Since, however, the reaction of the at least one low order hydridosilane compound (I) with the hydridosilane compound (II) having a weight average molecular weight of at least 500 g/mol involves the hydridosilane compound (I) undergoing an oligomerization which is speeded by the hydridosilane compound (II) or a conversion of both components (I) and (II), the process product of the process according to the present invention will have a higher weight average molecular weight than the weight average molecular weight which is determinable for the reaction mixture comprising said components (I) and (II) via GPC measurements.

In principle, any desired hydridosilane compound (II) having a weight average molecular weight of at least 500 g/mol can be used. Preferably, however, this compound has a weight average molecular weight of 500-5000 g/mol and preferably 1000-4000 g/mol.

How the at least one hydridosilane compound (II) was synthesized is unimportant in principle. However, particularly good results are obtained when the at least one hydridosilane compound (II) having a weight average molecular weight of at least 500 g/mol is a hydridosilane compound obtainable by a thermal treatment of low order hydridosilanes. Hydridosilane compounds obtainable by the thermal treatment of low order hydridosilanes have the advantage particularly over hydridosilane compounds having a weight average molecular weight of at least 500 g/mol and obtainable via irradiation processes that their weight average molecular weight is relatively easy to adjust via the choice of reaction parameters, that they are nonetheless obtainable relatively quickly and at low cost and inconvenience in terms of apparatus, and lead to advantageous layer properties.

It is very particularly preferable for the at least one hydridosilane compound (II) to be a hydridosilane having a weight average molecular weight of at least 500 g/mol and obtained by a thermal treatment of low order hydridosilanes of the formulae $Si_nH_{2n}$ (with n=3-10), $Si_nH_{2n+2}$ (with n=3-10) and $Si_nH_{2n-2}$ (with n=6-10) respectively.

It is even more preferable for the at least one hydridosilane compound (II) to be a hydridosilane which is obtainable by thermal treatment of neopentasilane ($Si_5H_{12}$) and has a weight average molecular weight of 500-5000 g/mol, more preferably 1000-4000 g/mol and even more preferably 1500-3000 g/mol.

Preferred temperatures for the thermal treatment of low order hydridosilanes to prepare the high order hydridosilane compound (II) are between 30 and 250° C., preferably between 90 and 180° C. and more preferably between 110 and 160° C. Preferred reaction times are between 400 and 1500 minutes and preferably between 450 and 1000 minutes.

Since the appropriate processes for preparing the hydridosilane compound (II) do not lead to a process product conforming to a single structural formula, the reference herein to "a" or "one" high order hydridosilane compound (II) is to be understood as meaning a mixture of hydridosilane compounds which has a molecular weight distribution and comes from a single synthesis. Correspondingly, more than "one" high order hydridosilane compound (II) will be concerned when using a mixture of hydridosilane compounds coming from different syntheses.

It is preferable to use, within the meaning of these definitions, only "one" hydridosilane compound (II), since this correspondingly permits particularly good control over the molecular weight distribution of the high order hydridosilane compound to be synthesized.

Particularly rapid reaction times are obtained when the at least one hydridosilane compound (II) is used in weight percentage fractions of 0.01-10% by weight and preferably 0.5-5% by weight based on the total mass of low order hydridosilane compound (I) and hydridosilane compound (II).

The process for reacting the at least one low order hydridosilane compound (I) in the presence of the at least one hydridosilane compound (II) can in principle be conducted in any desired manner. The process of the present invention is particularly simple to carry out and further leads to particularly good yields when it is therefore more preferably conducted as a liquid phase process, i.e. as a process wherein the reaction mixture containing or consisting of the at least one low order hydridosilane compound (I) and the at least one hydridosilane compound (II) is a liquid phase in the course of the reaction.

This liquid phase reaction is preferably carried out using a solvent, since this makes it possible to influence the molecular weight distribution, to achieve particularly good reaction control and to obtain a very homogeneous molecular weight distribution. Preferred solvents for this use can be selected from the group consisting of linear, branched or cyclic, saturated, unsaturated or aromatic hydrocarbons of 1-12 carbon atoms, alcohols, ethers, carboxylic acids, esters, nitriles, amides, sulfoxides and water.

To obtain particularly good results, the solvent is preferably used in proportions of 20-80% by weight based on the total mass of the composition.

The reaction is further carried out thermally. The energy input required therefor can be introduced using microwave radiation, IR radiation as well as a hotplate, a thermostat, a heating jacket or an oven. To obtain particularly good results, the reaction is carried out at temperatures of 30-250° C., preferably 90-180° C. and more preferably 110-160° C. (temperature of reaction mixture).

Preferred reaction times are between 0.1 and 12 h, more preferably between 1 and 8 h and even more preferably between 2 and 6 h.

To obtain preferred high order hydridosilane compounds whereby doped silicon layers are obtainable particularly effectively, at least one dopant selected from the group consisting of $B_2H_6$, $BH_xR_{3-x}$ (with x=0-2 and R=$C_1$-$C_{10}$-alkyl, unsaturated cyclic $C_2$-$C_{10}$-alkyl), ether- or amine-complexed $BH_xR_{3-x}$ (with x=0-3 and R=$C_1$-$C_{10}$-alkyl, unsaturated cyclic $C_2$-$C_{10}$-alkyl), $Si_5H_9BR_2$ (R=H, Ph, $C_1$-$C_{10}$-alkyl), $Si_4H_9BR_2$ (R=H, Ph, $C_1$-$C_{10}$-alkyl), red phosphorus, white phosphorus ($P_4$), $PH_xR_{3-x}$ (with x=0-3 and R=Ph, $SiMe_3$, $C_1$-$C_{10}$-alkyl), $P_7(SiR_3)_3$ (R=H, Ph, $C_1$-$C_{10}$-alkyl), $Si_5H_9PR_2$ (R=H, Ph, $C_1$-$C_{10}$-alkyl) and $Si_4H_9PR_2$ (R=H, Ph, $C_1$-$C_{10}$-alkyl) may preferably be added to the reaction mixture before or during the reaction.

Preferably, the at least one dopant is added in amounts of 0.01-20% by weight based on the total mass of the composition.

The invention further provides the high order hydridosilane compounds obtainable by the process of the invention. The hydridosilanes obtainable by the process of the invention are particularly preferable, since pure layers of silicon are obtainable therewith in a particularly effective way.

The invention further provides for the use of the high order hydridosilane compounds obtainable according to the invention and preferably of the high order hydridosilanes obtainable according to the invention for producing optoelectronic component layers, electronic component layers or layers comprising silicon, preferably for producing layers of elemental silicon.

The examples which follow shall elucidate the subject matter of the present invention. They shall not have a restrictive effect, however.

EXAMPLES

All examples are carried out under protective gas. $H_2O$, $O_2$<1 ppm

Inventive Example

Thermal Treatment of Neopentasilane $Si(SiH_3)_4$ by Seeding:

0.5 g of a hydridosilane compound (II) (prepared as per Comparative Example 1) is introduced into a glass apparatus and heated to 155° C. Then, 10 g of neopentasilane are added and the reaction mixture is subjected to thermal treatment for 200 minutes to obtain about 7 g of a high order hydridosilane which, according to GPC measurement after cooling down, has a weight average molecular weight of 2130 g/mol.

Comparative Example 1

Thermal Treatment of Neopentasilane $Si(SiH_3)_4$:

about 10 g of neopentasilane are introduced into a glass apparatus and heated to 154° C. for 480 minutes to obtain a hydridosilane which, according to GPC measurement after cooling down, has a weight average molecular weight of 2200 g/mol.

Comparative Example 2

UV Treatment of Neopentasilane $Si(SiH_3)_4$:

2 g of neopentasilane are introduced into a glass vessel and irradiated with UV light for 840 minutes. This produces small amounts of hydridosilane which, according to GPC measurement, has a weight average molecular weight of 930 g/mol.

The invention claimed is:

1. A process for preparing a high order hydridosilane compound from a low order hydridosilane compound, the process comprising:
    thermally reacting a low order hydridosilane compound (I) in the presence of a hydridosilane compound (II) having a weight average molecular weight of at least 500 g/mol.

2. The process of claim 1, wherein the low order hydridosilane compound (I) is a linear or branched hydridosilane of formula $Si_nH_{2n+2}$, wherein n is an integer from 3 to 10.

3. The process of claim 2, wherein the low order hydridosilane compound (I) is neopentasilane.

4. The process of claim 1, wherein the hydridosilane compound (II) has a weight average molecular weight in the range of 500-5000.

5. The process of claim 1, wherein the hydridosilane compound (II) is a hydridosilane compound obtained by thermally treating low order hydridosilanes.

6. The process of claim 5, wherein the hydridosilane compound (II) is a hydridosilane having a weight average molecular weight of at least 500 g/mol and obtained by a-thermally treating low order hydridosilanes of the formulae $Si_nH_{2n}$, wherein n is an integer from 3 to 10; $Si_nH_{2n+2}$, wherein n is an integer from 3 to 10; and $Si_nH_{2n-2}$, wherein n is an integer from 6 to 10, respectively.

7. The process of claim 1, wherein the weight fraction of the hydridosilane compound (II) is from 0.01-10% by weight, based on the total mass of low order hydridosilane compound (I) and the hydridosilane compound (II).

8. The process of claim 1, which is conducted as liquid phase process.

9. The process of claim 8, wherein the process is conducted in the presence of at least one solvent.

10. The process of claim 9, wherein a content of the solvent is from 20-80% by weight based on the total mass of the reaction mixture.

11. The process of claim 1, wherein the reaction is conducted at a temperature in the range from 30-250° C.

12. The process of claim 1, wherein the reaction is carried out for a time in the range from 0.1 to 12 h.

13. The process of claim 1, further comprising, before or during the thermal reaction, adding a dopant to the reaction mixture, wherein the dopant is at least one selected from the group consisting of:

$B_2H_6$;

$BH_xR_{3-x}$, wherein x is 0, 1, or 2, and R is a $C_1$-$C_{10}$-alkyl or an unsaturated cyclic $C_2$-$C_{10}$-alkyl;

an ether-complexed $BH_xR_{3-x}$ or an amine-complexed $BH_xR_{3-x}$, wherein x is an integer from 0 to 3 and R is a $C_1$-$C_{10}$-alkyl or an unsaturated cyclic $C_2$-$C_{10}$-alkyl;

$Si_5H_9BR_2$, wherein R is H, Ph, or a $C_1$-$C_{10}$-alkyl;

$Si_4H_9BR_2$, wherein R is H, Ph, or a $C_1$-$C_{10}$-alkyl;

red phosphorus;

white phosphorus ($P_4$);

$PH_xR_{3-x}$, wherein x is an integer from 0-3 and R is Ph, $SiMe_3$, or a $C_1$-$C_{10}$-alkyl;

$P_7(SiR_3)_3$, wherein R is H, Ph, or a $C_1$-$C_{10}$-alkyl;

$Si_5H_9PR_2$, wherein R is H, Ph, or a $C_1$-$C_{10}$alkyl; and $Si_4H_9PR_2$, wherein R is H, Ph, or a $C_1$-$C_{10}$-alkyl.

14. A hydridosilane compound obtained by the process of claim 1.

15. A layer comprising the hydridosilane compound of claim 14, wherein the layer is an optoelectronic component layer, an electronic component layer, or a layer comprising silicon.

16. The process of claim 1, wherein the hydridosilane compound (II) has a weight average molecular weight in the range of 1000-4000.

17. The process of claim 1, wherein the weight fraction of the hydridosilane compound (II) is from 0.5-5% by weight, based on the total mass of low order hydridosilane compound (I) and the hydridosilane compound (II).

18. The process of claim 1, wherein the reaction is conducted at a temperature in the range from 90-180° C. and the reaction is free of a metal catalyst.

19. The process of claim 1, wherein reaction is carried out for a time in the range from 1 to 8 h and a molecular weight of the high order hydridosilane obtained is 800 g/mol or more.

20. A process for preparing a high order hydridosilane compound from a low order hydridosilane compound, the process comprising:
    thermally reacting a low order branched hydridosilane compound of formula (I) in the presence of a hydridosilane compound (II) having a weight average molecular weight of at least 500 g/mol:

$$Si_nH_{2n+2} \qquad (I)$$

wherein n is an average value of 4 to 10, and wherein a molecular weight of the high order hydridosilane obtained is 800 g/mol or more.

* * * * *